United States Patent
Tomita

(10) Patent No.: US 7,490,857 B2
(45) Date of Patent: Feb. 17, 2009

(54) SEAT BELT APPARATUS AND PRETENSIONER

(75) Inventor: Hiroshi Tomita, Tokyo (JP)

(73) Assignee: Takata Corporation, Tokyo (JP)

( * ) Notice: Subject to any disclaimer, the term of this patent is extended or adjusted under 35 U.S.C. 154(b) by 226 days.

(21) Appl. No.: 11/496,572

(22) Filed: Aug. 1, 2006

(65) Prior Publication Data

US 2007/0029775 A1    Feb. 8, 2007

(30) Foreign Application Priority Data

Aug. 5, 2005   (JP) .............................. 2005-228599

(51) Int. Cl.
*B60R 22/46* (2006.01)
(52) U.S. Cl. .................................. 280/806
(58) Field of Classification Search ............... 280/806; 297/479, 480; 60/632, 638
See application file for complete search history.

(56) References Cited

U.S. PATENT DOCUMENTS

| | | | |
|---|---|---|---|
| 5,533,756 A | | 7/1996 | Dybro et al. |
| 6,039,353 A | * | 3/2000 | Bauer et al. ................. 280/806 |
| 6,068,664 A | | 5/2000 | Meyer et al. |
| 6,142,524 A | * | 11/2000 | Brown et al. ................ 280/806 |
| 6,149,242 A | * | 11/2000 | Pesta et al. .................. 297/480 |
| 6,264,281 B1 | * | 7/2001 | Dukatz et al. ............... 297/480 |
| 6,866,296 B2 | * | 3/2005 | Webber et al. .............. 280/806 |
| 6,877,776 B2 | * | 4/2005 | Ukita et al. ................. 280/806 |
| 7,188,868 B2 | | 3/2007 | Yamaguchi |
| 2003/0122362 A1 | * | 7/2003 | Ukita et al. ................. 280/806 |
| 2004/0256850 A1 | | 12/2004 | Yamaguchi |

FOREIGN PATENT DOCUMENTS

| | | |
|---|---|---|
| DE | 94 04 272.1 | 5/1994 |
| DE | 202 18 003 U 1 | 2/2003 |
| EP | 1 426 253 A1 | 6/2004 |
| WO | WO 96/04154 | 2/1996 |

* cited by examiner

*Primary Examiner*—John Q. Nguyen
*Assistant Examiner*—Robert A. Coker
(74) *Attorney, Agent, or Firm*—Foley & Lardner LLP

(57) ABSTRACT

A pretensioner with a wire-holding groove is formed in a housing at a bent portion, so that a wire, which holds a seat belt buckle at an upper end protruding from the wire-holding groove, is slidably held by the wire-holding groove. The wire slides and is displaced in a draw-in direction of the seat belt buckle when a gas generator is actuated and acted on a part of the wire closer to an end thereof, which extends in a front-to-back direction of a vehicle. The tongue piece bulging into the wire-holding groove restrains the wire from being pushed in due to a push-in load of the wire from the seat belt buckle. Conversely, the wire is allowed to be drawn in upon the actuation of the gas generator such that the pretension can enhance the reliability of a restraining function of a push-in displacement of a wire.

18 Claims, 9 Drawing Sheets

PRIOR ART

PRIOR ART

PRIOR ART

SEAT BELT APPARATUS AND PRETENSIONER

BACKGROUND

The present invention relates to a pretensioner which engageably holds a tongue of a seat belt and also automatically tenses the seat belt with the tongue being engaged and held according to detection of a predetermined trigger.

Generally, a seat belt apparatus for restraining an occupant is provided in order to prevent the occupant from being thrown forward due to an inertial force created by an impact such as a vehicle collision.

Also, such a seat belt apparatus is generally provided with an Emergency Locking Retractor (hereinafter, referred to as an ELR) which does not restrain motion of the occupant in normal driving but prevents the seat belt from being further withdrawn by locking a retraction shaft of the seat belt only when the occupant is subjected to an impact, for example, when the vehicle suddenly stops or is involved in a collision.

The ELR locks the retraction shaft within a very short time when detecting a deceleration equal to or higher than a predetermined value, so that the seat belt will not be withdrawn further.

However, according to the above-described ELR which merely locks the retraction shaft, in a case where the notwithdrawn seat belt is loosely retracted around the retraction shaft while restraining the occupant, a certain amount of the seat belt may be withdrawn even when the retraction shaft is locked. Also, even when the seat belt is not loosely retracted, the seat belt may still be withdrawn from the time when the deceleration equal to or higher than the predetermined value is detected up to the time when the retraction shaft is locked.

The looseness of the seat belt and the withdrawal of the seat belt caused by the time lag up to the time when the retraction shaft is locked should be minimized.

There is a known pretensioner which draws in a seat belt buckle when the same deceleration as that for a locking operation of the retraction shaft is detected and which serves as a device for canceling, in some measure, the looseness of the seat belt and the withdrawal of the seat belt caused by the time lag up to the time when the retraction shaft is locked such as, for example, shown in Japanese Domestic Re-Publication No. 2003-018374 (FIGS. 2 and 5) of PCT International Application ("JP Pub. No. '374") (which is incorporated by reference herein in its entirety).

FIG. 7 is an explanatory illustration of a vehicle seat and the peripheral portion showing an example of a seat belt apparatus provided with such a pretensioner.

In FIG. 7, a seat belt 3 is withdrawn from an ELR 2, which is arranged on a lower portion of a center pillar 1 on an inner side of a vehicle cabin, to an upper side of a vehicle body, passes through a through-ring 4 attached on an upper portion of the center pillar 1 and then extends to a lower side of the vehicle body, so that an end 3a of the seat belt 3 is fixed on an inner wall of the vehicle body between the center pillar 1 and a seat 5.

A tongue 6 is provided movably along the seat belt 3 at a portion of the seat belt 3 between the through-ring 4 and the end 3a.

The tongue 6 is held by a seat belt buckle 7, which protrudes upward from the seat 5 on an inner side of the vehicle body, by engaging with the seat belt buckle 7.

The seat belt buckle 7 is held on an upper end of a wire 8. Additionally, the seat belt buckle 7 and the wire 8 define a part of a pretensioner 9.

FIGS. 8 and 9 each show an example of the pretensioner 9, FIG. 8 showing a cross section of the pretensioner and FIG. 9 showing an exploded perspective view of the pretensioner.

The pretensioner 9 includes a base plate 10 fixed on a lateral surface of a sitting portion of the seat 5; a cover 11 (not shown in FIG. 8) holding an end of the wire 8 in cooperation with the base plate 10; a retainer 12, a washer 13, a screw 14 and a washer 15 for combination coupling of the base plate 10 and the cover 11; a guide pin 16 guided in long holes 10a and 11a which are respectively formed in the base plate 10 and the cover 11 and extend in a front-to-back direction of the vehicle; a piston rod 17 engaged with the guide pin 16; and a gas generator 18 for pushing out the piston rod 17.

Note that the gas generator 18 may be any known device, such as an actuator, a solenoid, an inflator or the like, which extends the piston rod 17 in response to a detection result, as a trigger, of a detector (not shown) which detects a deceleration of the vehicle.

A tip end 17a of the piston rod 17 forms a bent portion by bending an intermediate portion of the wire 8. The wire 8 extends in a vertical direction of the vehicle and in the front-to-back direction of the vehicle, and the bent portion serves as the boundary. Also, the guide pin 16 penetrates through the tip end 17a, so that the piston rod 17 extends along the long holes 10a and 11a.

The seat belt buckle 7 is fixed to an upper end of the wire 8, while a lower end of the wire 8 is fixed by the base plate 10 and the cover 11 in a fixed position. In addition, the intermediate portion of the wire 8 penetrates through the retainer 12.

With this configuration, since the piston rod 17 extends when the gas generator 18 is actuated, the upper end of the wire 8 is displaced in a draw-in direction integrally with the seat belt buckle 7, thereby canceling the withdrawal of the seat belt 3 from the ELR 2.

A cut raised portion 11b is provided in the cover 11. The cut raised portion 11b is formed by cutting and raising a part of the cover 11 inwardly so as to abut on an outer periphery of a curved portion of the wire 8 in a vicinity of the intermediate bent profile portion of the wire 8. The bent profile portion is biased by the piston rod 17. Accordingly, in normal use, a displacement of the wire 8 is restrained by the cut raised portion 11b even when the wire 8 is pushed in by the tongue 6 of the seat belt 3 pushed into the seat belt buckle 7 for fastening.

When the piston rod 17 extends upon the actuation of the gas generator 18 and the bent profile portion of the wire 8 is externally deformed and displaced, the cut raised portion 11b provides a fuse function by which the cut raised portion 11b is restored from the cut and raised state freely.

SUMMARY

One disclosed embodiment relates to a pretensioner. The pretensioner comprises a wire with a first end connected to a seat belt buckle; a piston connected to a second end of the wire for displacing the wire toward the second end; a cylinder slidably housing the piston; a gas generator supplying gas to the cylinder for moving the piston; and a bent passage slidably holding an intermediate portion of the wire. The wire is disposed along a bent profile of the bent passage. The pretensioner is provided with a lock member for restraining a sliding displacement of the wire.

Another embodiment of the invention provides a seat belt apparatus. The apparatus comprises a webbing for restraining an occupant; a retractor capable of retracting the webbing; a tongue provided on a portion of the webbing; a seat belt buckle to which the tongue is detachably attached; and a pretensioner. The pretensioner includes a wire with a first end connected to a seat belt buckle; a cylinder slidably housing a piston connected to a second end of the wire for displacing the wire toward the second end; a gas generator supplying gas to the cylinder for moving the piston; a bent passage slidably holding an intermediate portion of the wire; and a lock member for restraining a sliding displacement of the wire along a bent profile of the bent passage.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
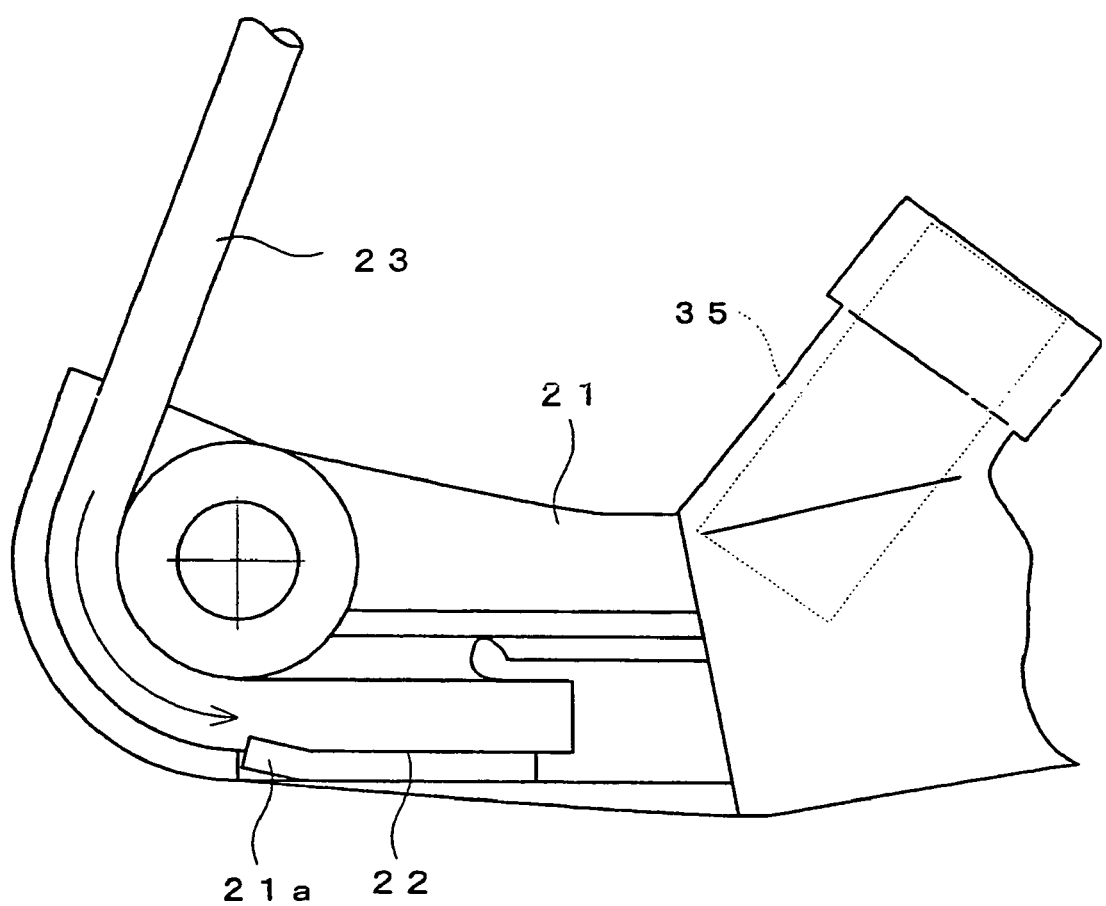
FIG. 1 is an explanatory illustration showing a primary portion of a pretensioner according to an embodiment of the invention.

As described above, according to the pretensioner 9 of JP Pub. No. '374, the cut raised portion 11b is restored when the piston rod 17 extends. Therefore, in the above-described pretensioner 9, a strength of the cut raised portion 11b cannot be set high since the strength should be set so as not to resist the motion of the piston rod 17.

As a result, when a high load is applied to the tongue 6 when pushed in or when a high load is generated in a push-in direction of the wire 8 because baggage or an occupant is put on the seat belt buckle 7, the cut raised portion 11b may be restored unintentionally, so that the restraining function of the push-in displacement of the wire 8 may not be so reliable.

An object of at least one of the disclosed embodiments is to provide a pretensioner which can enhance the reliability of the restraining function of the push-in displacement of the wire.

A first embodiment disclosed embodiment includes: a wire with a first end connected to a seat belt buckle; a piston connected to a second end of the wire for displacing the wire toward the second end; a cylinder slidably housing the piston; a gas generator supplying gas to the cylinder for moving the piston; and a bent passage slidably holding an intermediate portion of the wire, in which the wire is disposed along a bent profile of the bent passage, and wherein the pretensioner is provided with a lock member for restraining a sliding displacement of the wire.

According to the first embodiment, the intermediate portion of the wire extending from the first end toward the second end is slidably held by the bent passage, the seat belt buckle is connected to the one end of the wire, and the piston housed in the cylinder is connected to the other end. In emergency situations, gas is supplied from the gas generator and the piston connected to the second end of the wire in the cylinder is moved to apply a draw-in force on the second end of the wire, so that the wire is slidingly displaced along the bent profile of the bent passage, thus the seat belt buckle is drawn in. On the other hand, in normal situations, even when a load is applied from the seat belt buckle, the wire seems to be slidingly displaced along the bent profile of the bent passage. However in the first embodiment of the present invention, the lock member is provided for restraining the sliding displacement of the wire along the bent profile of the bent passage, so that the restraint on the sliding displacement is appropriately set with the lock member Thus, the sliding displacement in normal situations can be restrained (while the sliding displacement in emergency situations is allowed), and the wire can be restrained from being displaced when the wire is pushed in.

In addition, dissimilar to the conventional structure in which the strength of the lock member should be set so as not to resist the deformation of the wire because the lock member (cut and raised portion) is required to be restored in emergency situations, the strength of the lock member can be set high by the provision of the lock member such that the lock member has shape-retaining ability even when the wire is drawn in upon the actuation of the gas generator in emergency situations according to the first embodiment. Owing to this, for instance, the lock member may be restrained from being deformed unintentionally, and the reliability of the function of restraining a push-in displacement of the wire may be enhanced when a large load is applied when the tongue is pushed in, or when a high load is generated in the push-in direction of the wire because a baggage or an occupant is put on the seat belt buckle. Additionally, since the lock member will not be deformed in an emergent actuation, the function for restraining the push-in displacement in normal situations can be maintained for a relatively long term, thereby extending service life and improving durability. Thus, the performance of the pretensioner in actuation can be maintained by restraining the push-in displacement of the wire.

According to a second embodiment, the lock member is provided to protrude toward the wire at the bent passage such that pushing-in of the wire due to a push-in load of the wire applied from the seat belt buckle toward the first end of the wire is restrained while drawing-in of the wire due to a draw-in load applied on the second end of the wire caused by the motion of the piston is allowed.

Since the restraint on the sliding displacement is set such that the pushing-in of the wire in normal situations is restrained while the drawing-in of the wire caused by the motion of the piston in emergency situations is allowed, the sliding displacement in emergency situations can be allowed while the sliding displacement in normal situations is restrained.

According to a third embodiment, the lock member is provided on at least a wall surface on an outer peripheral side from among the wall surface on the outer peripheral side and a wall surface on an inner peripheral side of the bent profile of the bent passage.

In the actuation of the pretensioner, the piston slides in the cylinder since the (high-pressure) gas is supplied to the cylinder from the gas generator, and the wire connected to the piston is bent and slides in the bent passage to draw-in the buckle. In this time, since the wire slidingly displaces while shifting slightly to an inner peripheral side in the bent passage, the lock member disposed on the outer peripheral side of the bent passage does not interfere with the sliding displacement of the wire. Therefore, the pretensioner can further smoothly be actuated in emergency situations.

According to a fourth embodiment, the lock member is a protrusion protruding from the wall surface of the bent passage toward the wire.

For instance, a wedge stuck into the bent passage toward the wire from the outer peripheral side, a tongue piece formed by cutting and raising the wall surface of the bent passage toward the wire, a restrictor with a part thereof embedded in the wall surface of the bent passage, a bulged portion formed by protruding a part of the wall surface of the bent passage toward the wire, or the like is applicable to the protrusion, so that the sliding displacement of the wire in normal situations can be restrained so as to restrain the pushing-in of the wire.

According to a fifth embodiment, the protrusion is a tongue piece formed by cutting and raising the wall surface of the bent passage toward the wire.

According to the fifth embodiment, since the protrusion is the tongue piece formed by cutting and raising the wall surface of the bent passage toward the wire, the lock member can be provided by an easy processing.

According to a sixth embodiment, the protrusion is a bulged portion formed by protruding a part of the wall surface of the bent passage toward the wire.

With this configuration, the protrusion can be formed integrally with the bent passage for instance in the formation thereof, and thus, the protrusion can be provided easily. In addition, a restraining force against the draw-in load of the wire can easily be set according to the size, the profile or the like of the protrusion.

According to a seventh embodiment, the tongue piece or the bulged portion is cut and raised or bulged in a direction so as to be adjacent the wire at a time of the sliding displacement due to the push-in load applied from the one end toward the wire.

With this configuration, the restraining force for the displacement of the wire against the push-in load of the wire applied to the wire from the seat belt buckle can significantly be secured.

According to an eighth embodiment, the protrusion is a shaft-shaped or ball-shaped restrictor with a part thereof embedded in the wall surface of the bent passage.

With this configuration, the restraining force against the push-in load of the wire can easily be set according to the size, the profile or the like of the restrictor.

A ninth embodiment includes: a webbing for restraining an occupant; a retractor capable of retracting the webbing; a tongue provided to the webbing; a seat belt buckle to which the tongue is detachably attached; and a pretensioner which is provided with: a wire with a first end connected to a seat belt buckle; a cylinder slidably housing a piston connected to the second end of the wire for displacing the wire toward the second end; a gas generator supplying gas to the cylinder for moving the piston; a bent passage slidably holding an intermediate portion of the wire; and a lock member for restraining a sliding displacement of the wire along a bent profile of the bent passage.

According to the pretensioner, dissimilar to the conventional structure in which the strength of the lock member should be set so as not to resist the deformation of the wire because the lock member (cut and raised portion) is required to be restored in emergency situations, the strength of the lock member can be set high and the lock member is provided in such a manner that the lock member has shape-retaining ability even when the wire is drawn in upon the actuation of the gas generator in emergency situations. Owing to this, the reliability of the function of restraining the push-in displacement of the wire may be enhanced. Additionally, since the lock member will not be deformed in an emergent actuation, the function for restraining the push-in displacement in normal situations can be maintained for a relatively long term, thereby extending service life and improving durability.

According to embodiments of the present invention, the reliability of the function of restraining the push-in displacement of the wire can be enhanced.

An embodiment of the present invention will be described below with reference to the accompanying drawings.

Figure 2:
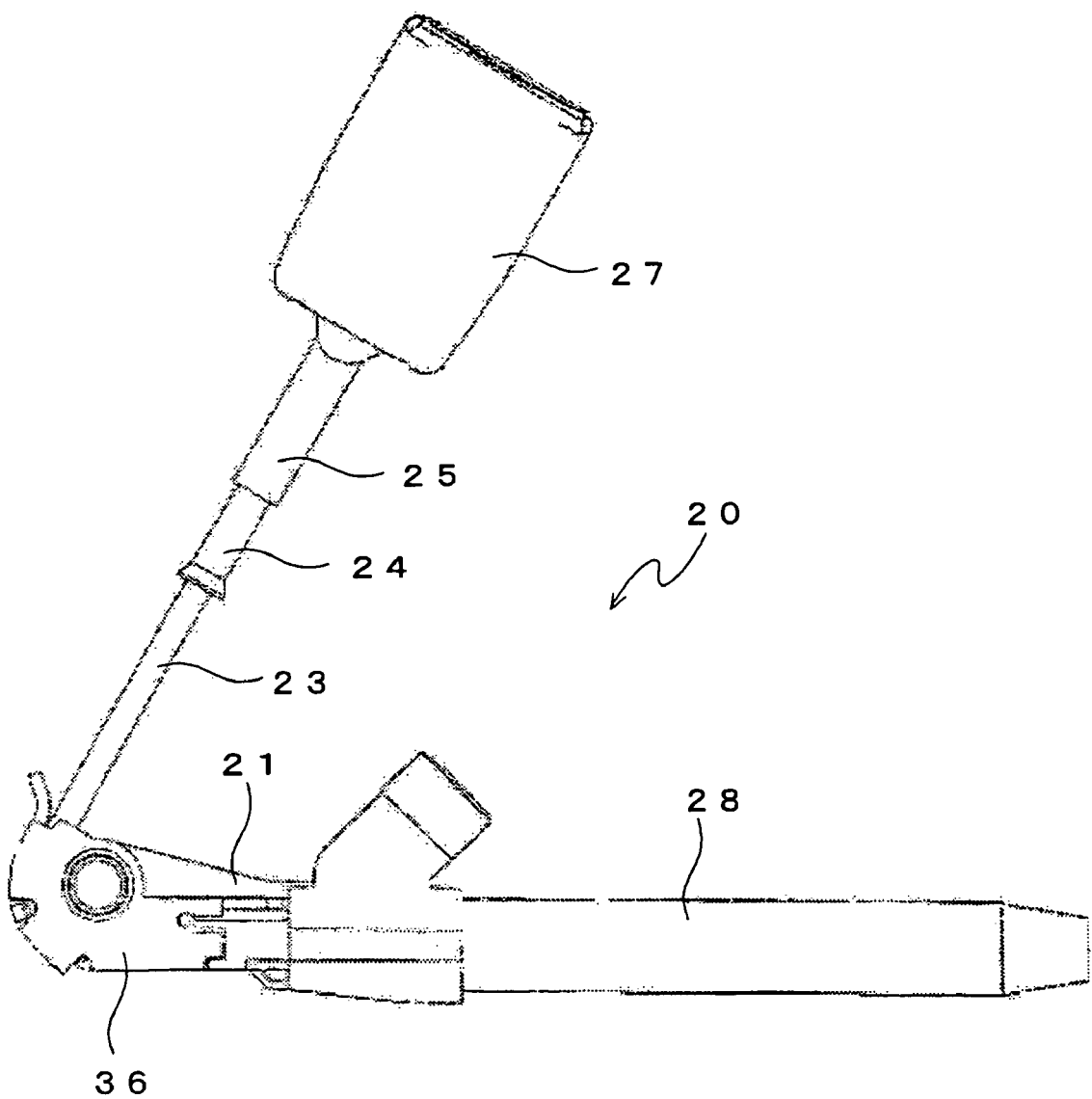
FIG. 2 is a side view of the pretensioner according to the embodiment.
Figure 3:
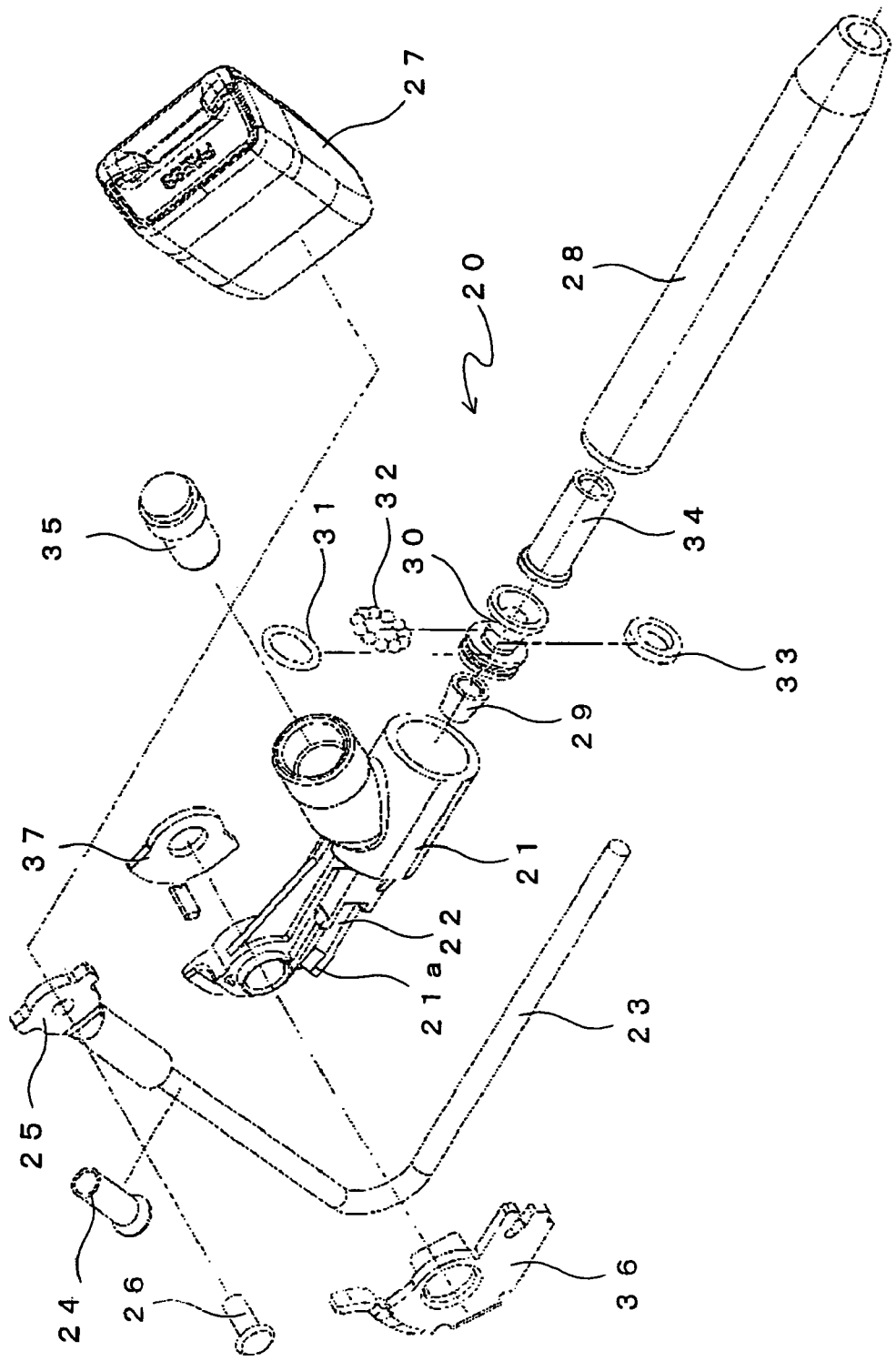
FIG. 3 is an exploded perspective view of the pretensioner according to the embodiment.
Figure 7:
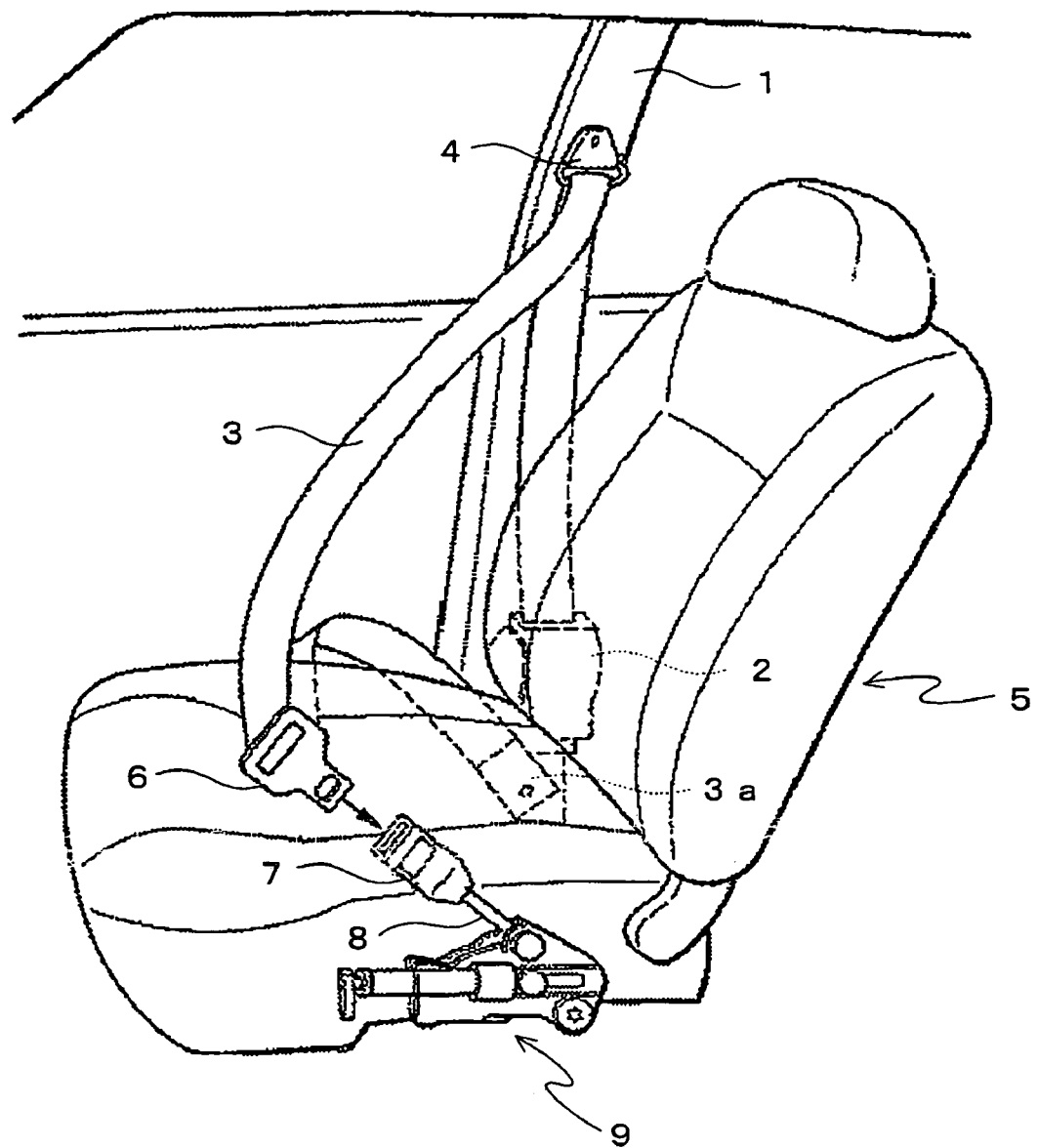
FIG. 7 is an explanatory illustration of a vehicle seat and the peripheral portion showing an example of a seat belt apparatus provided with the pretensioner.
Figure 8:
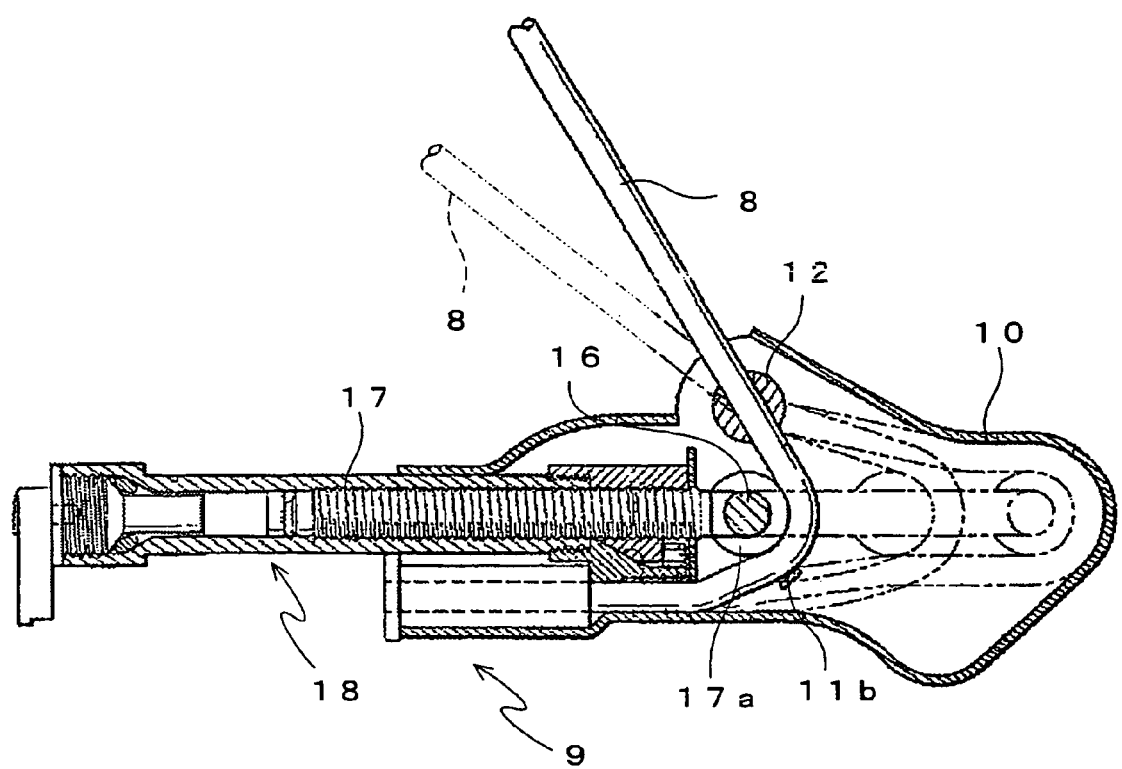
FIG. 8 is a cross section of a conventional pretensioner.
Figure 9:
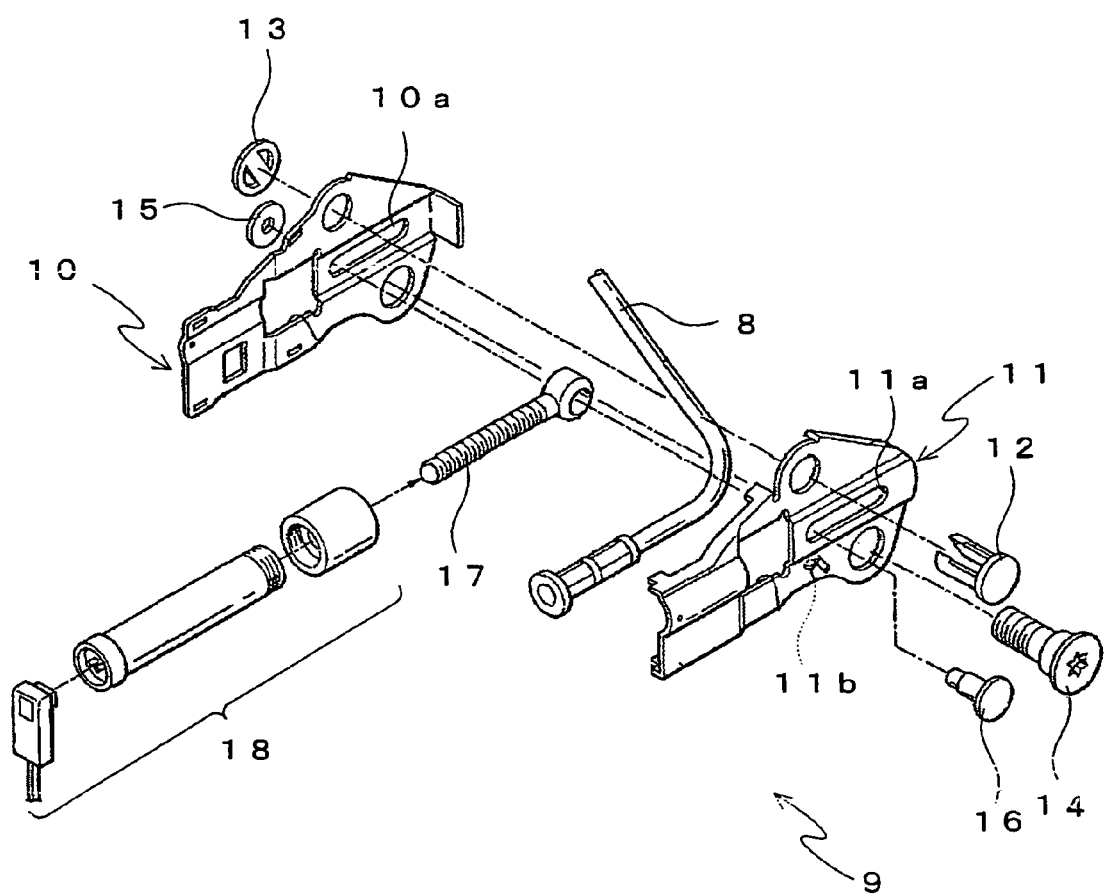
FIG. 9 is an exploded perspective view of the conventional pretensioner.

FIG. 1 is an explanatory illustration showing a primary portion of a pretensioner according to the embodiment. FIG. 2 is a side view of the pretensioner according to the embodiment. FIG. 3 is an exploded perspective view of the pretensioner according to the embodiment. Note that since the pretensioner according to the embodiment may be applied to the seat belt apparatus shown in FIG. 7, only the pretensioner will be described below and the description of the seat belt apparatus will be omitted. Also, the above-described base plate 10 and the cover 11 to be fixed to the vehicle body (seat) may not be necessary here, and therefore the illustration will be omitted.

As shown in FIG. 3, a pretensioner 20 includes a housing 21 as a vehicle fixture (bent passage) to be fixed to a vehicle body (seat) directly or indirectly via a base plate or the like (not shown); a wire 23 (corresponding to the wire 8) which is formed in a part of the housing 21 and is held at a part thereof by a wire-holding groove 22 extending in a vertical direction of the vehicle and in a front-to-back direction of the vehicle; a seat belt buckle 27 fixed to an end (upper end) of the wire 23 via a holder 24, an attachment bracket 25 and a rivet 26; a cylinder 28 connected to the housing 21; a seal 29, a piston 30, an O-ring 31, balls 32 and a ball ring 33 which are disposed in the cylinder 28 and through which a part of the wire 23 close to the other end thereof penetrates; a wire end 34 provided at the other end of the wire 23; a gas generator 35 held by the housing 21; and a bracket 36 and a sub-bracket 37 to be attached to the housing 21 while the wire 23 is held by the wire-holding groove 22.

The gas generator 35 is actuated (generates high-pressure gas) according to a detection result by a deceleration detector (not shown), for instance, when the vehicle crashes head-on, so that the piston 30, the O-ring 31, the balls 32, the ball ring 33 and the wire end 34 which are fixed to the other end of the wire 23 are drawn in toward an end of the cylinder 28, and consequently the seat belt buckle 27 is drawn in simultaneously as the wire 23 is displaced in a draw-in direction.

Meanwhile, a tongue piece 21a (locking member) is formed at a part of the housing 21 where the wire-holding groove 22 is formed. The tongue piece 21a is cut and raised such that the cut and raised end projects toward the wire-holding groove 22. At least one tongue piece 21a is provided on a wall surface on an outer peripheral side of a bent portion of the wire-holding groove 22 which has the wall surfaces on the outer peripheral side and on an inner peripheral side. Additionally, the tongue piece 21a has substantially the same thickness as that of the housing 21, thereby providing a shape-retaining ability. Further, the tongue piece 21a is cut and raised in a direction in which a tip end thereof is adjacent the wire 23 when the wire 23 is slidingly displaced in a direction of an arrow shown in FIG. 1 due to a push-in load from the seat belt buckle 27. Note that in a case where the wire 23 is displaced in the direction of the arrow shown in FIG. 1 due to a draw-in load of the piston 30 caused by the actuation of the gas generator 35, the tongue piece 21a is set to lock the wire 23 with a locking force allowing the displacement.

Figure 4:
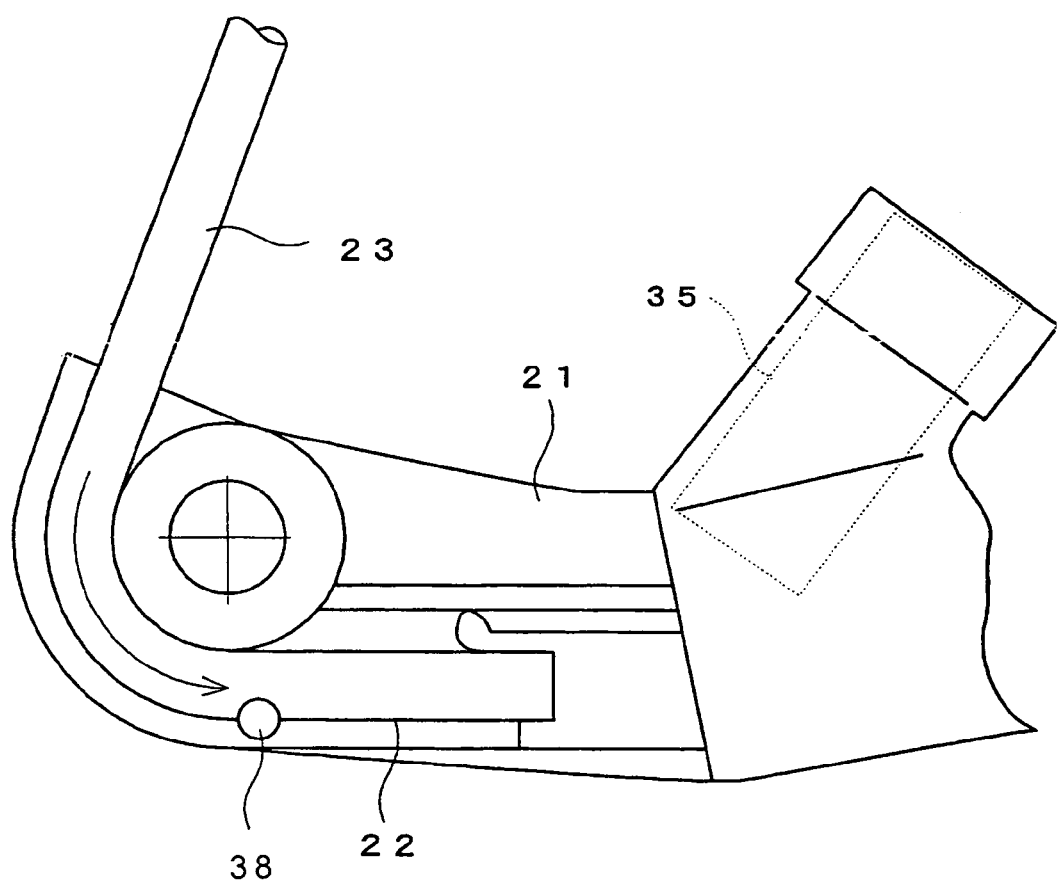
FIG. 4 is an explanatory illustration showing a primary portion of a modification of the pretensioner according to the embodiment.
Figure 5:
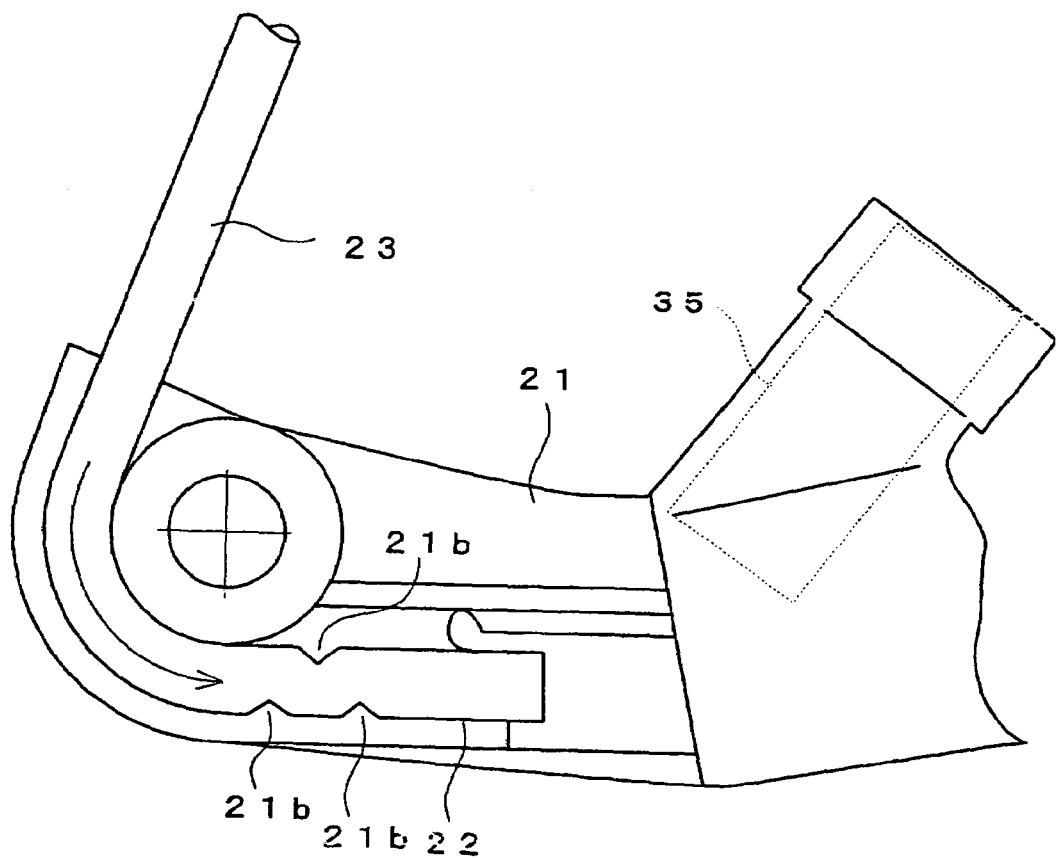
FIG. 5 is an explanatory illustration showing a primary portion of a modification of the pretensioner according to the embodiment.

The lock member may not be the above-described tongue piece 21a. For instance, the lock member may be a ball-shaped or shaft-shaped restrictor 38 with a part thereof embedded in the housing 21 as shown in FIG. 4, or it may be a plurality of bulged portions 21b (ribs) in which a part of the walls of the wire-holding groove 22 protrude inwardly at two positions on the wall surface on the outer peripheral side and at one position on the wall surface on the inner peripheral side with reference to the bent portion such that the wire 23 passes through the wire-holding groove 22. Alternatively the lock member may be a wedge or the like positioned toward an inner side of the wire-holding groove 22 from the outer peripheral side of the housing 21, though not particularly shown. In this case, the wedge or the like is fitted via a hole penetrating through the housing 21. The wedge or the like may be a screw to be screwed in the hole, or it may be fixed by adhesion or the like. Alternatively, after being fitted, the wedge or the like may be fixed with a seal which covers a part of an external surface of the housing 21 and the wedge.

Figure 6:
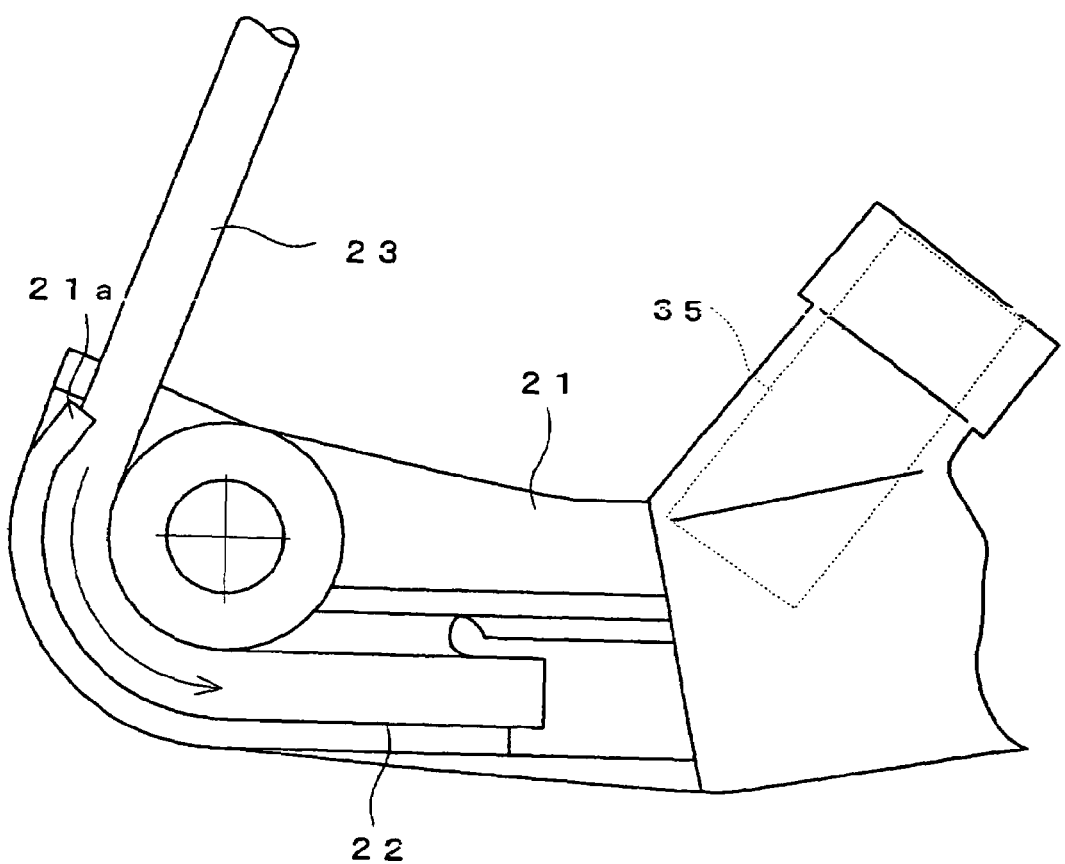
FIG. 6 is an explanatory illustration showing a primary portion of a modification of the pretensioner according to the embodiment.

In addition, the profile of the restrictor 38, as well as the profile, size and number of installations of the bulged portions 21b are not limited to the above description. For instance, similar to the tongue piece 21a, the bulged portions 21b may be bulged in the direction in which a tip end thereof is adjacent the wire 23. Alternatively, as shown in FIG. 6, the tongue piece 21a may be formed at a portion defining the groove wall in the vertical direction of the vehicle.

Japan Priority Application 2005-228599, filed Aug. 5, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A pretensioner, comprising:
   a wire including a first end connected to a seat belt buckle;
   a piston connected to a second end of the wire for displacing the wire toward the second end;
   a cylinder slidably housing the piston;
   a gas generator supplying gas to the cylinder for moving the piston;
   a bent passage slidably holding an intermediate portion of the wire; and
   a lock member for restraining a sliding displacement of the wire,
   wherein the lock member is provided to protrude toward the wire at the bent passage such that pushing-in of the wire due to a push-in load of the wire applied from the seat belt buckle toward the first end of the wire is restrained while drawing-in of the wire due to a draw-in load applied on the second end of the wire caused by motion of the piston is allowed.

2. The pretensioner according to claim 1, wherein the lock member is provided on a wall surface of the bent passage.

3. The pretensioner according to claim 1, wherein the lock member comprises a protrusion protruding from the wall surface of the bent passage toward the wire.

4. The pretensioner according to claim 3, wherein the protrusion comprises a bulged portion formed by protruding a part of the wall surface of the bent passage toward the wire.

5. The pretensioner according to claim 4, wherein the bulged portion is a rib extending in a direction so that a tip of the rib is adjacent the wire at a time of the sliding displacement due to the push-in load applied from the one end toward the wire.

6. The pretensioner according to claim 3, wherein the protrusion is a shaft-shaped or ball-shaped restrictor with a part thereof embedded in the wall surface of the bent passage.

7. A pretensioner comprising:
   a wire including a first end connected to a seat belt buckle;
   a piston connected to a second end of the wire for displacing the wire toward the second end;
   a cylinder slidably housing the piston;
   a gas generator supplying gas to the cylinder for moving the piston;
   a bent passage slidably holding an intermediate portion of the wire; and
   a lock member for restraining a sliding displacement of the wire,
   wherein the lock member comprises a protrusion protruding from the wall surface of the bent passage toward the wire, and
   wherein the protrusion is a tongue piece formed by cutting and raising the wall surface of the bent passage toward the wire.

8. The pretensioner according to claim 7, further comprising a pretensioner housing, and wherein a thickness of the tongue piece is substantially equal to the thickness of the housing.

9. The pretensioner according to claim 7, wherein the tongue piece is cut and raised in a direction so that a tip of the tongue piece is adjacent the wire at a time of the sliding displacement due to a push-in load applied from the one end toward the wire.

10. A seat belt apparatus, comprising:
    a webbing for restraining an occupant;
    a retractor capable of retracting the webbing;
    a tongue provided on a portion of the webbing;
    a seat belt buckle to which the tongue is detachably attached; and
    a pretensioner, the pretensioner comprising:
      a wire with a first end connected to a seat belt buckle;
      a cylinder slidably housing a piston connected to a second end of the wire for displacing the wire toward the second end;
      a gas generator supplying gas to the cylinder for moving the piston;
      a bent passage slidably holding an intermediate portion of the wire; and
      a lock member for restraining a sliding displacement of the wire along the bent passage,
    wherein the lock member is provided to protrude toward the wire at the bent passage so that pushing-in of the wire due to a push-in load of the wire applied from the seat belt buckle toward the first end of the wire is restrained while drawing-in of the wire due to a draw-in load applied on the second end of the wire caused by motion of the piston is allowed.

11. The apparatus according to claim 10, wherein the lock member is provided on a wall surface of the bent passage.

12. The apparatus according to claim 10, wherein the lock member comprises a protrusion protruding from the wall surface of the bent passage toward the wire.

13. The apparatus according to claim 12, wherein the protrusion is a tongue piece formed by cutting and raising the wall surface of the bent passage toward the wire.

14. The apparatus according to claim 13, further comprising a pretensioner housing, and wherein a thickness of the tongue piece is substantially equal to the thickness of the housing.

15. The apparatus according to claim 13, wherein the tongue piece is cut and raised in a direction so that a tip of the tongue piece is adjacent the wire at a time of the sliding displacement due to the push-in load applied from the one end toward the wire.

16. The apparatus according to claim 12, wherein the protrusion is a bulged portion formed by protruding a part of the wall surface of the bent passage toward the wire.

17. The apparatus according to claim 16, wherein the bulged portion is a rib extending in a direction so that a tip of the rib is adjacent the wire at a time of the sliding displacement due to the push-in load applied from the one end toward the wire.

18. The apparatus according to claim 12, wherein the protrusion comprises a shaft-shaped or ball-shaped restrictor wherein a portion of the restrictor is embedded in the wall surface of the bent passage.

* * * * *